Patented June 3, 1930

1,761,370

UNITED STATES PATENT OFFICE

ARNOLD SHEPHERDSON AND WILLIAM WYNDHAM TATUM, OF MANCHESTER, ENGLAND, ASSIGNORS TO BRITISH DYESTUFFS CORPORATION LIMITED, OF MANCHESTER, ENGLAND

NEW ANTHRAQUINONE DYE AND DYEING THEREWITH

No Drawing. Application filed January 27, 1928, Serial No. 250,094, and in Great Britain August 19, 1926.
Renewed October 21, 1929.

The production of dyes by the action of sulphites upon halogen-amino-hydroxyanthraquinones of the general formula:

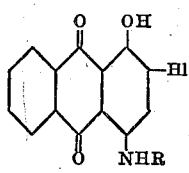

where R is an aryl group and Hl is a halogen, has heretofore been proposed. In one way of making dyes in this way 100 parts of 1-hydroxy-2-chlor-4-tolylamino-anthraquinone (such as may be obtained, for example, by heating 1-hydroxy-2:4-dichlor-anthraquinone with p-toluidine) are dissolved in 700 parts of phenol in an autoclave and treated with a solution of 180 parts of sodium sulphite crystals in 470 parts of water. The autoclave is then sealed up and the whole heated at a temperature of 150° to 180° C. for 5 hours. The phenol is steamed off and the new dyestuff isolated from the filtered liquor by adding salt. The new product forms, when dry, a blue powder soluble in water with a reddish-blue colour. From an acidulated dyebath, wool is dyed in brilliant reddish-blue shades of excellent fastness properties.

We have now further found that valuable acid dyes are obtained by a similar process from sulphonated derivatives of the above type in which the aryl radical R carries a sulphonic group. Such sulphonated derivatives may be prepared from 2.4-dichloro- or 2.4-dibromo-erythrohydroxyanthraquinone by reaction with an arylamine, followed by sulphonation, as described in British specification No. 21,897 of 1900. The disulphonated products obtained according to our invention by the substitution of the beta-halogen atom by a sulphonic group differ from the monosulphonated products already known in possessing greatly increased solubility and in general they give greener shades on wool from an acid bath.

Certain claims of our co-pending application No. 167,067 are restricted to the toluidino derivatives, the other claims are directed to the broad class of compounds to which the invention relates. The present application is concerned with the anilino derivatives and is a continuation in part of the above co-pending application.

One method of carrying out our invention is as follows, the parts being by weight:

Example 100 parts of the sodium salt of 2-chloro-1-hydroxy-4-(p-sulphoanilino)-anthraquinone of the structure—

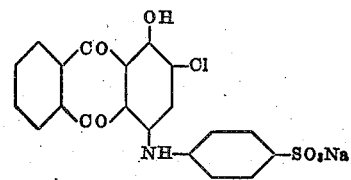

(prepared by sulphonating with 5% fuming sulphuric acid the 2-chloro-1-hydroxy-4-anilinoanthraquinone of M. P. 194–195° C.) are boiled with a solution of 100 parts of sodium sulphite crystals in 4000 parts of water until a test sample is practically completely soluble when cold. Any traces of unchanged mono-sulphonate are then filtered off cold, and the disulphonate is isolated by evaporation of the filtrate.

The dyestuff is then obtained in the form of its sodium salt. The free acids possess no advantage over the salts obtained in this way.

100 parts of wool are introduced into a bath containing 1 part of the colouring matter so isolated, 10 parts of Glauber's salt, 4 parts of sulphuric acid and 5000 parts of water. On raising the temperature, the colour is rapidly absorbed by the wool, which after an hour's boiling becomes dyed a reddish-blue shade of excellent fastness. After-chroming turns the shade green.

When it is desired to produce the dyestuff in the form of free acid, the liquors obtained by filtering off the mono-sulphate may be acidified before evaporation.

What we claim and desire to secure by Letters Patent is:—

1. The manufacture of new acid dyestuffs of the general type:

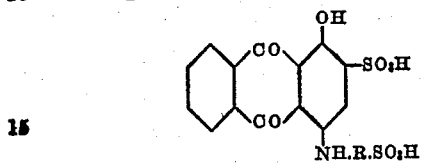

where R represents a divalent aryl residue, in the form of a sodium salt, consisting in treating a sodium salt of a 2-chloro-1-hydroxy-4-sulphoanilinoanthraquinone with a solution of a metal sulphite, removing unchanged monosulphonate by filtration in the cold, and evaporating the filtrate.

2. The acid dyestuff, being a 2-sulphonic derivative of 4-(sulphonanilino)-1-hydroxyanthraquinone, and having in the form of its sodium salt the formula

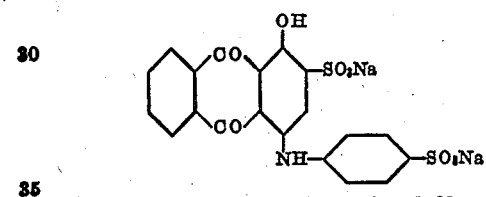

in substance and on the animal fibre, the said dyestuff being a dark violet powder, soluble in water and in dilute acids to purple solutions, and in concentrated sulphuric acid to a green solution becoming blue on addition of boric acid, giving when dyed on wool or silk from an acid bath, redder shades than the corresponding 4-(sulpho-p-toluidino) derivative.

In testimony whereof we affix our signatures.

ARNOLD SHEPHERDSON.
WILLIAM WYNDHAM TATUM.